US012590802B2

(12) United States Patent
Lange et al.

(10) Patent No.: US 12,590,802 B2
(45) Date of Patent: *Mar. 31, 2026

(54) SYSTEM FOR GUIDING AN OPERATOR WHEN COMPACTING CONCRETE

(71) Applicant: Wacker Neuson Produktion GmbH & Co. KG, Reichertshofen (DE)

(72) Inventors: Christian Lange, Ingolstadt (DE); Rudolf Berger, Gruenwald (DE); Patrick Diller, Hohenwart (DE); Alto Weiskopf, Altomuenster (DE)

(73) Assignee: Wacker Neuson Produktion GmbH & Co. KG, Reichertshofen (DE)

( * ) Notice: Subject to any disclaimer, the term of this patent is extended or adjusted under 35 U.S.C. 154(b) by 42 days.

This patent is subject to a terminal disclaimer.

(21) Appl. No.: 18/390,200

(22) Filed: Dec. 20, 2023

(65) Prior Publication Data

US 2024/0210176 A1     Jun. 27, 2024

(30) Foreign Application Priority Data

Dec. 21, 2022     (DE) ..................... 10 2022 134 330.8

(51) Int. Cl.
*G01C 21/20* (2006.01)

(52) U.S. Cl.
CPC .................................... *G01C 21/20* (2013.01)

(58) Field of Classification Search
CPC .... G01C 21/20; G01C 21/1654; G01C 15/00; G01C 21/005; G01C 21/183; G01C 21/188; G01C 21/206; G01C 1/00; G01C 17/00; G01C 21/12; G01C 21/3415; G01C 15/002; G01C 19/5719; G01C 21/16;

(Continued)

(56) References Cited

U.S. PATENT DOCUMENTS

| | | | | |
|---|---|---|---|---|
| 7,144,191 | B2 * | 12/2006 | Kieranen | ................ E01C 19/40 |
| | | | | 701/50 |
| 2010/0189503 | A1 * | 7/2010 | Burkhardt | ............... E02D 19/04 |
| | | | | 405/14 |
| 2021/0180295 | A1 * | 6/2021 | Jones | .................... E02F 9/2054 |

FOREIGN PATENT DOCUMENTS

| | | |
|---|---|---|
| CN | 111305576 A | 6/2020 |
| DE | 102006053393 A1 | 5/2008 |

(Continued)

OTHER PUBLICATIONS

JP-2016191193-A, English translation, Nov. 10, 2016, JPO (Year: 2016).*

(Continued)

*Primary Examiner* — Mike Anderson

(74) *Attorney, Agent, or Firm* — Boyle Fredrickson, S.C.

(57) ABSTRACT

A system for guidance of an operator during concrete compaction using a concrete compaction device includes a planning device for storing planning data. The planning data is used to define locations in a defined region, at which concrete compaction is to be performed using the concrete compaction device, and to define a sequence of the locations in which concrete compaction is to be performed. The system also includes a position determination device for determining the respective current position of the concrete compaction device, and a display device for displaying, at least in each case, the location in the sequence of locations at which concrete compaction is currently to be performed.

15 Claims, 5 Drawing Sheets

(58) Field of Classification Search
CPC .............. G01C 21/165; G01C 21/3461; G01C
21/3815; G01C 9/00; G01C 9/06; G01C
15/008; G01C 15/02; G01C 15/12; G01C
17/28; G01C 17/38; G01C 21/26; G01C
21/32; G01C 21/343; G01C 21/3484;
G01C 21/3492; G01C 21/3602; G01C
21/3617; G01C 21/3691; G01C 3/02;
G01C 5/00; G01C 9/02; G01C 9/04
See application file for complete search history.

(56) References Cited

FOREIGN PATENT DOCUMENTS

| | | | |
|---|---|---|---|
| DE | 102018118552 | A1 | 2/2020 |
| JP | 2019206910 | A | 12/2019 |
| JP | 6781439 | B1 * | 11/2020 |
| JP | 7012980 | B1 | 1/2022 |
| JP | 2022090859 | A | 6/2022 |

OTHER PUBLICATIONS

JP-6781439-B1 Concrete Compaction Evaluation System And Compaction Evaluation Method (Year: 2019).*
U.S. Appl. No. 18/390,179, filed Dec. 20, 2023.

* cited by examiner 80
cm

13

SYSTEM FOR GUIDING AN OPERATOR WHEN COMPACTING CONCRETE

BACKGROUND OF THE INVENTION

1. Field of the Invention

The invention relates to a system and method for guidance of an operator during concrete compaction.

2. Description of the Related Art

Freshly poured, still free-flowing concrete has to be compacted to release gas inclusions from the concrete and even out gravel pockets. The quality and strength of the concrete is thus increased. A variety of technical guidelines contain corresponding specifications for the concrete compaction.

Mobile, i.e., portable, internal vibrators are often used for concrete compaction. Such internal vibrators have a vibrating unit for generating a vibration or oscillation, which is introduced into the still free-flowing concrete in order to compact the concrete. The vibrating unit can have, for example, an imbalance exciter and an electric motor driving the imbalance exciter, which are arranged in a common housing, for example a vibrator housing. Furthermore, an operating unit, such as a switch housing, a frequency converter, or the like can be provided as part of the internal vibrator. The vibrating unit and operating unit can be connected to one another by a robust protection and operation tube. The electrical lines for the drive in the vibrating unit are led in the interior of the protection and operation tube. An operator can guide the vibrating unit by grasping the protection and operation tube and immerse it in a targeted manner at the desired points into the concrete to be compacted.

Internal vibrators are also known in which the electric drive is not arranged in the vibrator housing, but rather outside. In this case, the rotational movement of the electric drive is transmitted via a flexible shaft to the imbalance exciter in the vibrating unit. The flexible shaft can also be arranged in the interior of the protection and operation tube.

The electric drive can be supplied on a construction site via electric current from a public grid or from a special construction site grid. The current acquired via the grid can be converted into current suitable with respect to voltage, type of current (alternating current), and frequency for the electric drive with the aid of a frequency converter.

More recently, internal vibrators have also become known which acquire their electrical energy via an accumulator (electrical energy storage device). The accumulator can be arranged, for example, in a backpack carrying system, which can be carried by an operator on their back. In addition to the accumulator, a frequency inverter for generating the current required for the electric drive, for example three-phase current, can also be arranged in the backpack carrying system. The backpack carrying system enables a high level of mobility of the internal vibrator without an electrical connection to a grid being required. One example of such a backpack carrying system is described in DE 10 2018 118 552 A1.

The concrete compaction using internal vibrators is usually carried out in practice on the basis of assumptions or on the basis of the experience of the user. To achieve the correct compaction duration and to signal to the user that sufficient compaction of the concrete has been achieved, methods have been developed which are described, for example, in post-published patent applications DE 10 2022 118 541 A1 and DE 10 2022 118 542 A1. In this way, the user learns that compaction has been performed sufficiently at the location of the current compaction. The selection of the compaction location, in particular the selection of the immersion location, at which the vibrator housing of the internal vibrator is immersed into the concrete to be compacted, however, still takes place based on experiential values or assumptions of the user.

Even in the event of prior planning of the concreting project, the user who guides the internal vibrator will not carry along a plan in paper form or the like, since he requires both hands for operating the internal vibrator.

Especially in the case of larger concreting projects, for example factory floors or ceiling concreting projects, sufficient compaction has to be ensured and possibly also documented. It can be possible to determine and document the location of the compaction in the concrete. However, the operator does not receive feedback as to whether certain points have been compacted or omitted. The operator also does not receive information about where compaction is to be performed next in order to make the compaction process as efficient as possible. The compaction is thus solely dependent on the experience and care of the operator.

SUMMARY OF THE INVENTION

The invention is based on the object of enabling operator guidance for the concrete compaction in consideration of the location of the compaction and the compaction progress upon a respective immersion process.

The object is achieved by providing a system for guidance of an operator during concrete compaction using a concrete compaction device. The system has a planning device for storing planning data, wherein the planning data are used to define locations in a defined region at which a concrete compaction is to be performed using the concrete compaction device. The system additionally has a position determination device for determining the respective current position of the concrete compaction device, and a display device for displaying the respective location at which concrete compaction is currently to be performed.

The system can assist an operator during the concrete compaction in the context of a concreting process as an assistance system, by giving notifications to the operator at which location a respective concrete compaction is currently to take place in each case. The compaction locations can in particular be locations at which the concrete compaction device is to be immersed into the concrete to be compacted.

In one variant, a sequence of the locations of the concrete compaction can also be specified to the operator. The planning data can also be used to define a sequence of the locations here, in which the concrete compaction is to take place, wherein the display device can be designed to display the respective location in the sequence of locations at which concrete compaction is currently to be performed.

Locations can thus be defined in which compaction is to be performed, wherein at least one location is displayed at which compaction is to be performed.

The operator can then follow the specified sequence of the compaction locations during the concreting process. This specification of a sequence can have the advantage that path optimization can be connected thereto, so that the concreting can be carried out in a time-optimized and cost-optimized manner. Alternatively, however, the operator can also deviate therefrom and select their own compaction sequence.

In one variant, for example, the operator can have a type of map displayed having locations at which compaction is to be performed and process these locations according to their own selection, however, and thus arrive at the desired compaction goal. If locations are omitted here, these could be displayed as compaction flaws, for example in a "heat map". The operator can thus recognize which points still have to be compacted.

It is thus possible that depending on the variant or operating mode, in each case only one compaction location, multiple compaction locations (without defined sequence), or multiple compaction locations (with defined or proposed sequence) are displayed to the operator.

In particular an internal vibrator known per se, in which a vibrator housing is immersed into the concrete to be compacted, is suitable as a concrete compaction device. The vibrator housing encloses an imbalance exciter driven by an electric motor and is guided by the operator via a protection and operation tube connected thereon. In one variant, the electric motor is arranged outside the vibrator housing and is carried, for example, by the operator. The rotational movement of the electric motor can then be transmitted via a flexible shaft to the imbalance exciter in the vibrator housing.

The region defined as relevant for the planning device can be, for example, a (surface) area having concrete to be compacted, for example within a formwork. In particular, the defined region can be the concrete surface into which the concrete compaction device is to be immersed. The concrete surface can be detected as a whole or also divided into subregions, which can each be understood as a defined region.

The respective immersion points for the vibrator housing of an internal vibrator can be understood as the locations. In particular, the locations within an area (for example the concrete surface) can be provided with coordinates of the optimal immersion points.

The sequence of locations corresponds to the sequence of immersion points, at which in succession the vibrator housing is to be immersed into the concrete to be compacted and the concrete is thus to be compacted.

The display device indicates to the operator at which point he is to currently perform concrete compaction. This is possible, for example, by corresponding action instructions, for example that the operator is to move the internal vibrator by a specific distance forward or to the side. The operator can follow these action recommendations and thus easily immerse the internal vibrator into the concrete at the point specified by the planning device. The operator can thus see on the display device where he is currently to perform compaction.

The display device can have a display, on which the operator can see the location directly or via which he receives a corresponding action instruction in order to reach the location. For example, the display device can be a smart phone, a tablet, a smartwatch, or the like. It is also possible to use VR (virtual reality) glasses or AR (augmented reality) glasses. The use of a head-up display is also possible.

The display device can be designed to display the position of the concrete compaction device and/or to display at least the respective location in the sequence of locations at which concrete compaction is to be performed next. The operator can thus recognize on the display device how much the positions of internal vibrator and immersion location differ from one another. The operator can thus easily reduce the deviation by moving the internal vibrator and compact at the intended point. It is possible here not only to display the currently provided immersion point, but also the next or also the further immersion points. The operator thus also recognizes the practicality of the planning data specified by the planning device.

The display device can be designed to display the location at which concrete compaction is to be performed currently or next in relation to the current position of the concrete compaction device. The current position of the internal vibrator can be displayed in relation to the current and/or the next compaction location.

A compaction coordinate specification device can be provided for generating planning data which are storable in the planning device. The compaction coordinate specification device can be provided separately, for example in the form of a laptop or even remotely in a larger data network. It only has to be connected to the planning device as needed in order to transmit the (possibly externally) generated planning data. The planning data can also comprise, in addition to the immersion or compaction locations, information on the respective compaction duration or on the degree of compaction sought. The parameters compaction duration or degree of compaction give an indication that the concrete has been sufficiently compacted at the corresponding point.

A confirmation device can be provided, for confirming that, at the respective location at which concrete compaction is currently being performed, sufficient concrete compaction has been achieved, wherein the confirmation device can be designed to mark the next location in the sequence of locations at which concrete compaction is to be performed next. In this way, the locations can be processed, thus compacted, in succession, in particular in the sequence specified by the planning device. The compaction sequence is thus not dependent on the experience or intuition of the operator, but rather can be planned efficiently and externally specified.

The confirmation device can be used, for example, in that the operator clicks away the locations in succession when sufficient compaction has been performed there. This can also be displayed via the display device. The display device can also switch here to the next location in the specified sequence when the current location has been "clicked away" as sufficiently compacted.

The confirmation device can be actuatable manually by an operator to confirm that sufficient compaction has been performed. Additionally or alternatively, the confirmation device can also be automatically actuatable if a compaction recognition device has recognized that sufficient compaction has been performed at the current location by the concrete compaction device.

For this purpose, it is described, for example, in post-published patent applications DE 10 2022 118 541 A1 and DE 10 2022 118 542 A1 how sufficient compaction in the concrete to be compacted can be detected.

Accordingly, for example, on the basis of a measured current acquisition of the electric motor driving the imbalance exciter, inferences can be drawn about the compaction and thus about the compaction progress in the medium to be compacted. In particular, the detected current measured values and current measured value profiles can be set in relation to previously known criteria and profiles and inferences can be drawn therefrom. This is also possible by evaluating the current gradients (change of the current consumption over time).

With the aid of respective sampled current values and respective gradients of the current values or the tendency of the current value development, it may be seen in which operating state the internal vibrator is presently located. During a compaction process, the compaction status of the concrete can be recognized and, for example, compared to limiting values on the basis of the current profile thus resulting, thus the current values and the gradient profile. When a specific limiting value is reached, this is assessed as a criterion that the concrete has been sufficiently compacted at this point.

For the precise guidance of the operator, it is necessary to detect the position of the concrete compaction device, thus in particular the position of the vibrating unit, for example the vibrator housing, precisely. The position determination device can be designed suitably for this purpose.

In particular, the position determination device can be designed as a device for determining the position of a vibrating unit that can be guided by an operator for concrete compaction, having a surface position determination device having a receiver device, wherein the surface position determination device is designed to determine the position of the receiver device in the plane; having an orientation determination device for determining an orientation of a working direction of the operator; and having a correction device for correcting the position of the receiver device with an offset in the direction of the orientation of the working direction and thus for determining the position of the vibrating unit in the plane.

The surface position determination device is used for determining the position or for localizing the receiver device. The surface position determination device is thus capable of determining the location of the receiver device in the surface or in the plane, thus at least two-dimensionally.

The correction device is used for correcting the position of the receiver device determined by the surface position determination device with the aid of an offset, wherein the orientation of the working direction determined by the orientation determination device is taken into consideration. The offset represents a correction value in the direction of the orientation determined by the orientation determination device and thus the orientation of the operator. In this way, it is taken into consideration with the aid of the offset that the vibrating unit is not arranged in the plane directly at the receiver device, but rather is at a distance therefrom.

The surface position determination device can have at least one positioning system, selected from the group RTK (Real Time Kinematic), DGPS (Differential Global Positioning System), UWB (Ultra-wide Band). Such positioning systems enable very high accuracy in the range of a few centimeters in the horizontal. Furthermore, Bluetooth wireless devices or optical systems, for example having image recognition, are possible as positioning systems.

A depth position determination device can be provided, for determining the position of the vibrating unit in the depth. The depth can be measured here in particular in relation to the position of the receiver device, thus, for example, by measuring the distance to the receiver device. In particular, the z coordinate of the distance can be ascertained here in order to obtain a measure of the depth relative to the receiver device. Other measuring methods are also possible to determine the depth position of the vibrating unit.

In this way, in addition to the above-described two-dimensional position detection in the surface or plane (planar position), a third dimension (depth position) can also be determined. The position of the vibrating unit can thus be determined three-dimensionally, in order to also detect the location of the vibrating unit in deep concrete components, such as walls.

A comparison device can be provided for comparing the current position of the concrete compaction device to at least the current first location of the specified sequence of locations at which concrete compaction is to be performed next and for detecting a deviation of the position of the concrete compaction device from the specified location; and having a guidance device for defining a movement measure for moving the concrete compaction device, wherein the deviation can be decreased using the movement measure; wherein the display device is designed to display the movement measure to the operator.

The operator thus receives a recommendation via the display device for a suitable movement measure in order to reduce the deviation between the immersion position or compaction position, on the one hand, and the position of the concrete compaction device (for example, the vibrator housing). For example, the operator can move the internal vibrator or change the immersion point. Instructions, such as arrows, or route indications can be displayed here via the display device, as to how the operator is to move the internal vibrator.

A proximity detection device can be provided for detecting a state in which the deviation is less than a specified deviation limiting value and for generating a confirmation signal. The deviation limiting value defines a permissible deviation between the (theoretically) specified "ideal" immersion location and the actual immersion location at which the vibrator housing is immersed into the concrete to be compacted. Upon falling below the deviation limiting value, a confirmation signal can be generated for the operator that the vibrator housing was immersed at the correct position.

The planning data can comprise, in addition to the data for defining the locations at which concrete compaction is to take place, further data selected from the group: duration of the compaction at the relevant location, intensity of the compaction at the relevant location, number of vibrations of the compaction at the relevant location, concrete type or concrete variety, concrete mixing ratios, data on the rebar (in particular arrangement, constrictions, planned so-called vibration chutes), dumping height of the concrete, outside or ambient temperature, temperature of the concrete, ambient humidity. It can thus be defined in detail how strongly at which location or at which immersion point compaction is to be performed. This can be of interest in particular if the concrete part to be compacted is contoured very differently, so that compaction has to be performed at different strengths or different intensities at various locations.

A method is specified for guidance of an operator during concrete compaction using a concrete compaction device. The method incudes storing planning data, wherein the planning data are used to define locations in a defined region at which concrete compaction is to be performed using the concrete compaction device, and to define a sequence of the locations in which the concrete compaction is to be performed. He method additionally includes determining the respective current position of the concrete compaction device, and displaying at least in each case the location in the sequence of locations at which concrete compaction is currently to be performed and/or the location in the sequence of locations at which concrete compaction is to be performed next.

BRIEF DESCRIPTION OF THE DRAWINGS

These and further features and advantages of the invention are explained in more detail hereinafter on the basis of examples with the aid of the appended figures. In the figures.

DETAILED DESCRIPTION

Figure 1:
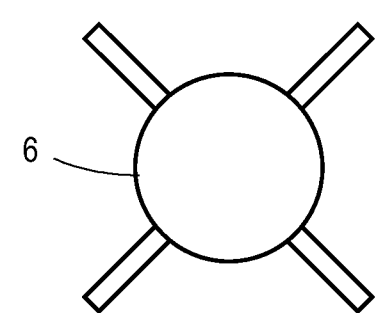
FIG. 1 shows a schematic top view of a position determination device for determining the position of a vibrating unit, which can be guided by an operator, for concrete compaction.
Figure 1:
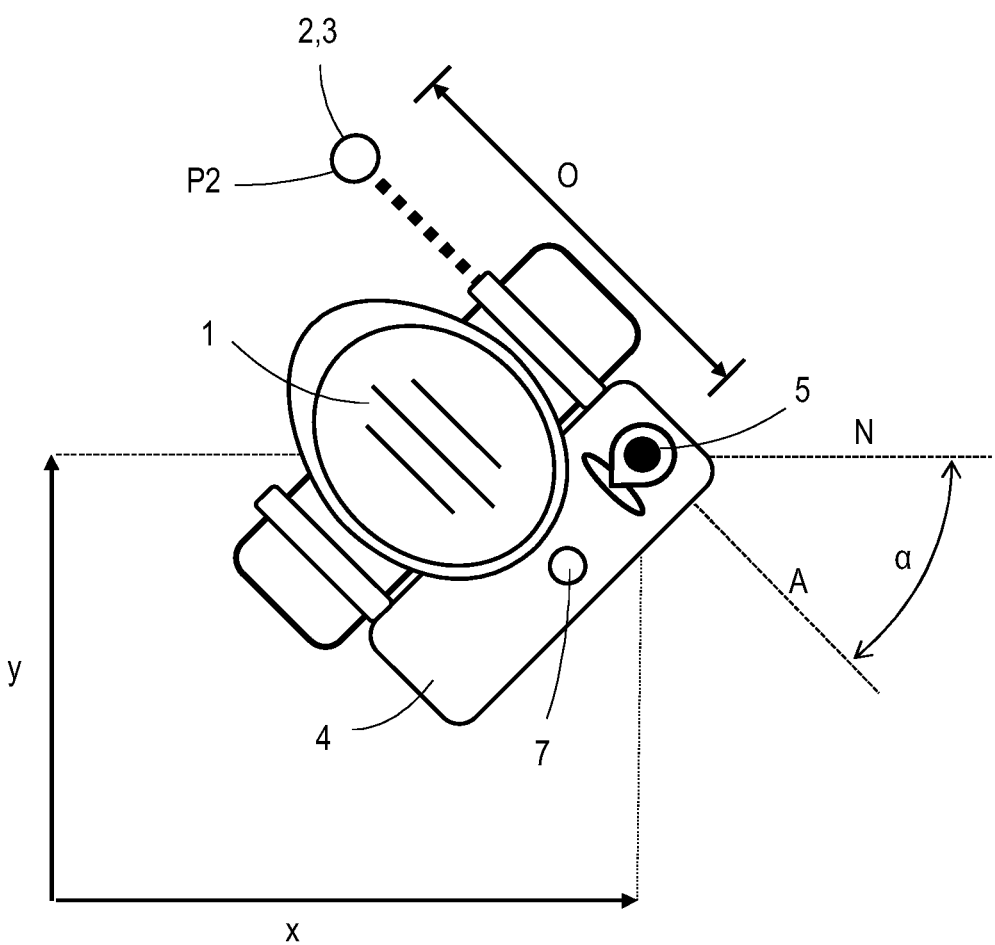

FIG. 1 shows a schematic top view of an operator 1 (the protective helmet of the operator 1 can be seen well in the top view), who guides an internal vibrator 2 for concrete compaction. Only a vibrating unit 3 is shown of the internal vibrator 2 in FIG. 1, which is often also designated as a vibrator housing and contains an imbalance exciter (not shown) for generating the compaction vibrations and an electric motor for driving the imbalance exciter. The construction of such an internal vibrator 2 is known and therefore does not have to be discussed in more detail at this point.

The vibrating unit 3 is immersed by the operator into the concrete to be compacted and held for a certain time at one location. The operator then moves the vibrating unit 3 to another location in order to continue the compaction at another point.

Various methods have been developed for determining the compaction progress, which indicate or communicate to the operator to what extent the compaction has progressed at the relevant point or whether sufficient compaction has been achieved (for example, in the form of a degree of compaction). Reference is made by way of example to the post-published patent applications DE 10 2022 118 541 A1 and DE 10 2022 118 542 A1.

The internal vibrator 2 is equipped with a position determination device, with the aid of which the position of the vibrating unit 3 can be determined with high precision in three-dimensional space, as will be explained later.

The electric motor located in the vibrating unit 3 is fed by an electrical energy storage device or accumulator (not shown), which is carried by the operator in a backpack 4 on his back. In addition to the accumulator, further components can also be arranged in the backpack 4, such as a frequency converter (not shown), using which the electric current acquired from the accumulator can be adapted in a manner suitable for the electric motor in the vibrating unit 3. In particular, the direct current acquired from the accumulator is converted here into alternating current or three-phase current and adapted with respect to the frequency.

Furthermore, a receiver 5 used as a receiver device is arranged in the backpack 4. The receiver 5 is designed such that its location can be determined with high or the highest possible precision. Suitable positioning methods can be used for this purpose, such as the methods RTK (Real Time Kinematic), DGPS (Differential Global Positioning System), and/or UWB (Ultra-Wideband).

In the example shown in FIG. 1, the position measurement is carried out according to the RTK method with the aid of the receiver 5, designed as an RTK receiver, in connection with a fixed base station 6, which is arranged on the construction site in the vicinity of the work location.

Accuracies of 1 to 2 cm in the horizontal can be achieved with the RTK system. The coordinates of the points are calculated in real time after the initialization. The precise positions are determined as in the DGPS system relative to reference stations having fixed coordinates, such as the base station 6 here.

The positioning system together with the receiver 5 and—if provided—the base station 6 form a surface position determination device.

The precise position of the receiver 5 can be defined, for example, by coordinates x, y in relation to the base station 6.

Furthermore, an orientation determination device 7 is carried by the operator 1 with the aid of the backpack 4. The orientation determination device 7 can also be attached at another location on the operator 1. It is used to determine the orientation of the operator 1 relative to a fixed coordinate system, for example relative to magnetic north. The working direction of the operator can be concluded directly from the orientation of the operator 1.

In the example shown in FIG. 1, the measured orientation of the operator 1 is identified with A, which differs from an absolute orientation, for example the north direction N, by the angle α. The working direction and the viewing direction of the operator 1 are also connected to the orientation A.

The orientation determination device 7 can have an electronic compass module or a magnetometer having multiple degrees of freedom to detect the spatial orientation A of the operator 1.

The position of the internal vibrator, in particular the vibrating unit 3, can be calculated with high accuracy by the position of the operator 1 detected with the aid of the receiver 5 and the positioning system and the orientation A of the operator 1 detected by the orientation determination device 7. For this purpose, an offset O having the corresponding angle (for example a) is added to the position x, y, which was measured for the location of the receiver 5 on the backpack 4. Offset O can take into consideration the arm length of the operator here, for example, wherein an inclined arm posture can also be calculated in. Moreover, the distance of the receiver 5 from the arm of the operator 1 can be calculated in, which is located in the backpack 4 in the example shown in FIG. 1 and thus behind the arm of the operator 1.

In this way, the two-dimensional position P2 in the plane or surface and thus the two-dimensional position of the vibrating unit 3 in the top view shown in FIG. 1 can be determined with high accuracy.

In addition, the depth is also detected in the position determination device, so that the three-dimensional position of the vibrating unit 3 can be determined. This will be explained on the basis of FIGS. 2 and 3.

Figures 2, 3:
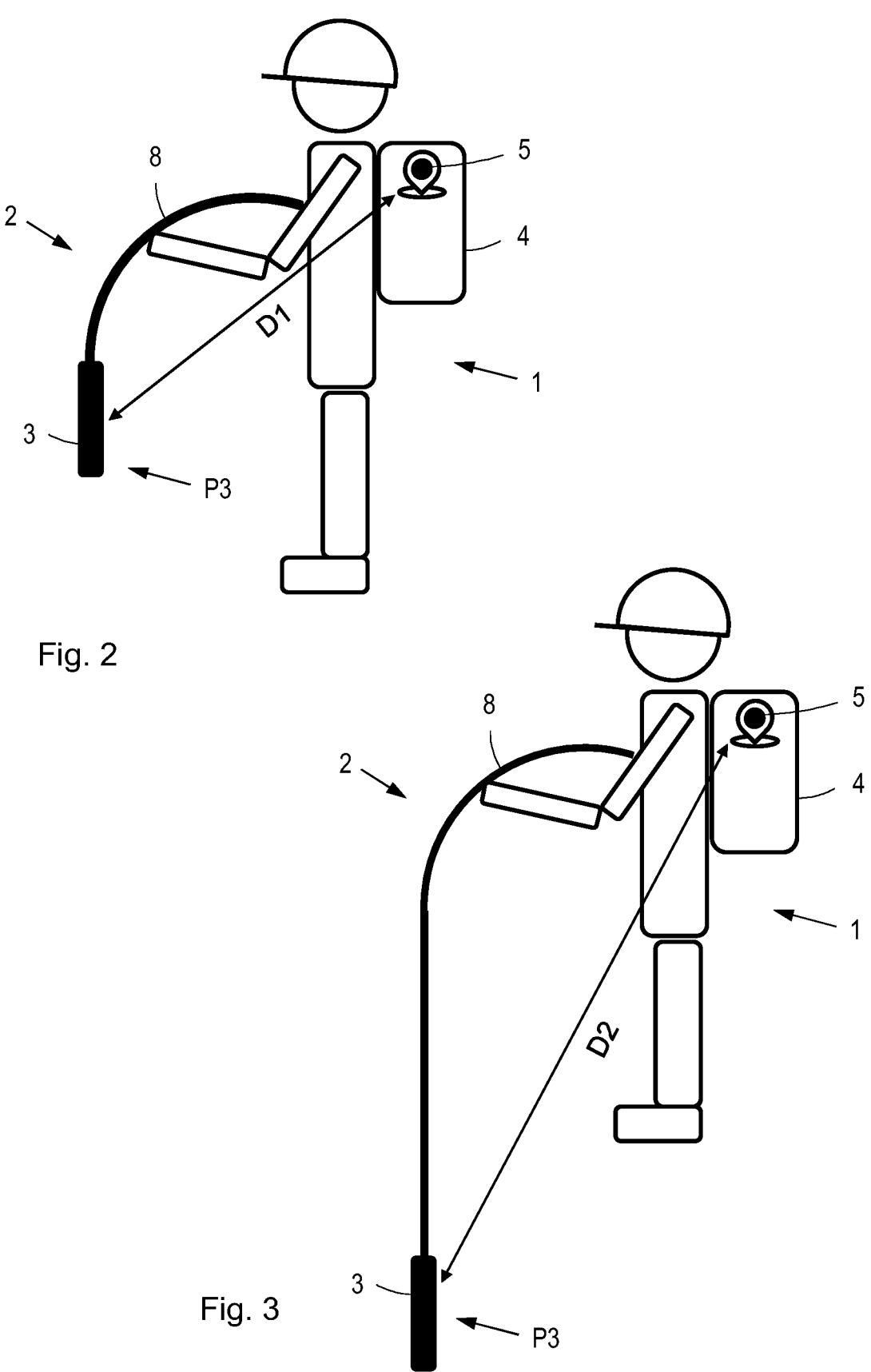
FIG. 2 shows the position determination device from FIG. 1 in a side view.
FIG. 3 shows the position determination device from FIG. 1 in a side view, but having an internal vibrator having a longer protection and operation tube.

FIGS. 2 and 3 show the operator 1 in a schematic side view, in each case with the internal vibrator 2. The internal vibrator 2 has the vibrating unit 3, which is held via a protection and operation tube 8. The protection and operation tube 8 connects the vibrating unit 3 to the accumulator in the backpack 4. Electrical lines, via which the electric motor in the vibrating unit 3 can be supplied with electric current, extend in the interior of the protection and operation tube 8. Moreover, the protection and operation tube 8 is designed to be held by the hands of the operator 1, as can be seen in FIGS. 2 and 3. The protection and operation tubes 8 have different lengths in FIGS. 2 and 3.

The position determination device has a further measuring system for determining the position of the vibrating unit 3 in the depth.

A depth position determination device is provided for determining the position of the depth of the vibrating unit 3. In particular a depth coordinate in relation to the receiver 5 is measured here. This can be achieved, for example, in that the distance of the vibrating unit 3 to the receiver 5 is determined. This distance is identified with D1 in FIG. 2 and with D2 in FIG. 3. A depth coordinate in the z direction, which measures the relative height difference (depth) of the vibrating unit 3 to the receiver 5, may be derived from the distance D1, D2 and the further, above-explained coordinates or dimensions.

The detection of the depth and thus the third dimension of the position of the vibrating unit 3 allows the position to be detected even in deep concrete parts, for example walls, three-dimensionally and thus with high accuracy.

For this purpose, the distance of the vibrating unit 2 to the receiver 5 or also to a further transceiver device is measured. The further transceiver device can be carried in a suitable manner by the operator and, for example, can also be housed in the backpack 4.

The determination of the distance between internal vibrator and receiver 5 and/or the further transceiver device (not shown) can be measured by evaluating the signal strength of a radio signal exchanged between the components.

Upon deeper immersion of the vibrating unit 3 into the concrete to be compacted, the distance D1, D2 increases, so that the signal strength decreases. An inference can thus be made about the immersion depth.

The position of the vibrating unit 3 thus determined can be transmitted, for example, to a mobile device or corresponding gateway and can additionally be acquired for the documentation of the concreting process.

The system creates the possibility of completely documenting a concreting project and assigning the determined degrees of compaction not only generally by location in the surface, but also spatially. So-called heat maps can be created for documentation, which can also be three-dimensional in the case of deeper components.

Moreover, the precise detection of the respective location of the vibrating unit 3 during the concreting process, in conjunction with the respective degree of compaction, represents a foundation for assistance systems which can guide the operator 1. In particular, it can be displayed to the operator 1 at which points the vibrating unit 3 of the internal vibrator 2 still has to be immersed to ensure complete compaction of a concreting project.

One example of such an assistance system will be explained hereinafter.

Figure 4:
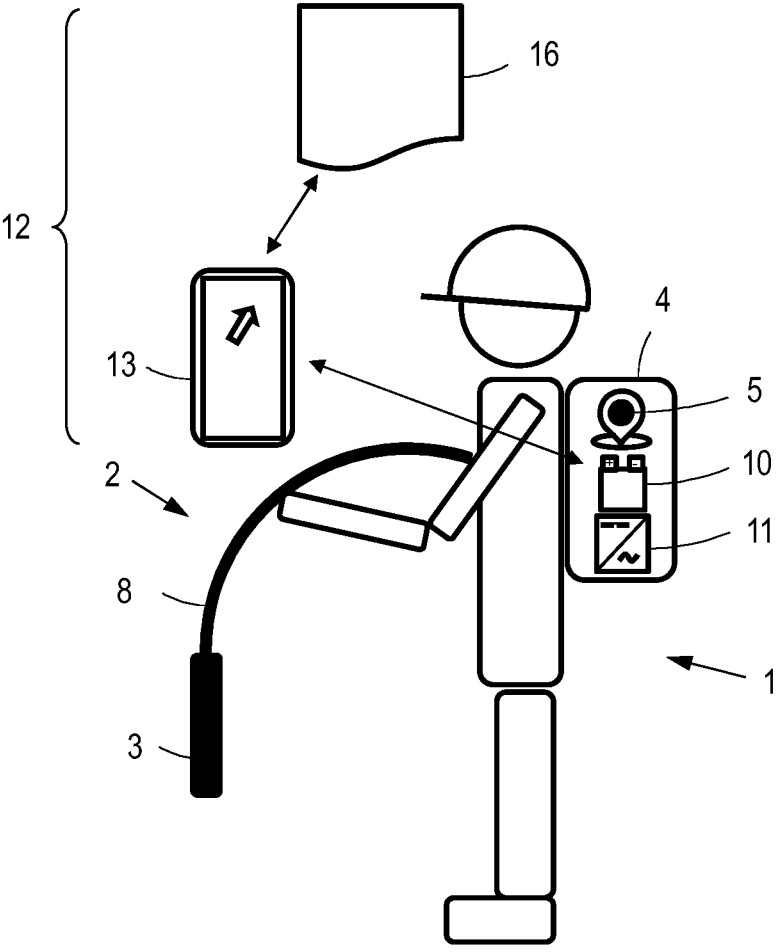
FIG. 4 shows the integration of the position determination device in an assistance system.

FIG. 4 shows the operator 1 with the internal vibrator 2. In addition, it is shown by way of example that, in addition to the receiver 5, an accumulator 10 used as an electrical energy storage device and a frequency converter 11 for the energy supply of the electric motor in the internal vibrator 2 are arranged in the backpack 4.

Furthermore, an assistance system 12 is provided, for guidance of the operator 1 during the concrete compaction. The assistance system 12 can have one or more components which are used in particular for planning the position and sequence of the compaction locations, for position determination of the current position of the vibrating unit 3, and for displaying the respective current compaction location at which the operator 1 is to position the vibrating unit 3.

A display 13 is provided as part of the assistance system, on which it is displayed to the operator 1 where they are to move the vibrating unit 3 of the internal vibrator 2 in order to be able to position and immerse the vibrating unit 3 at a point (immersion location) specified by the assistance system 12.

For this purpose, it is possible with the aid of the assistance system 12 to create planning data beforehand about which locations of a concrete surface of the still free-flowing concrete are to be compacted. The sequence of the compaction locations can be defined at the same time.

Figure 5:
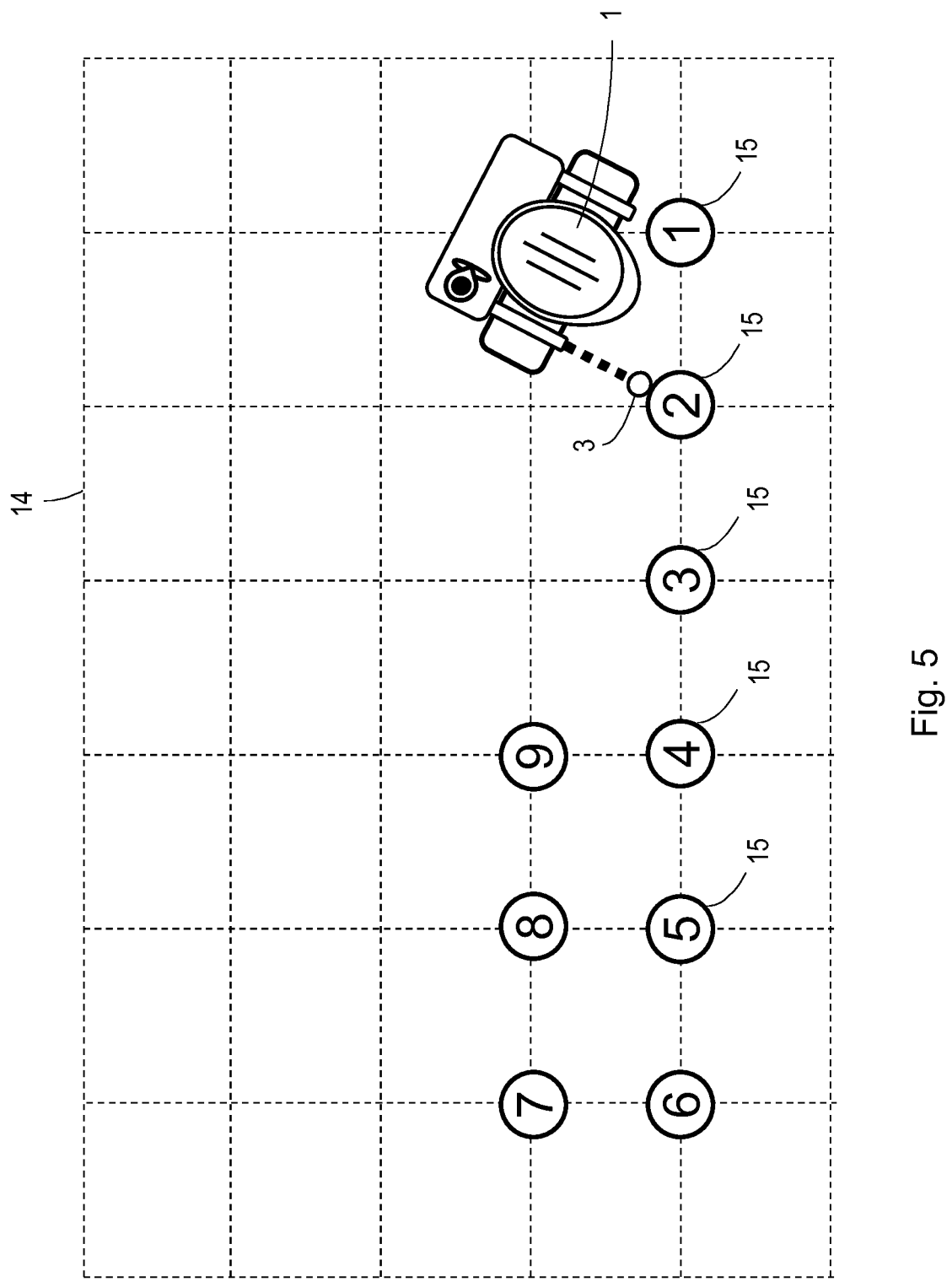
FIG. 5 shows a top view of a surface to be concreted and a compaction process using the assistance system.

FIG. 5 shows a top view of an example of the concreting of a surface, such as a factory floor.

A defined region 14 is stored in the assistance system 12, which can correspond to the entire surface of the factory floor to be concreted or also only to a partial surface of the factory floor.

The defined region 14 is divided into compaction locations 15, at which compaction is to be performed with the aid of the internal vibrator 2. In the example shown, the compaction locations 15 are continuously numbered by 1, 2, 3, . . . , 9. The further areas of the defined region 14 can also be defined as compaction locations 15 in this way.

In the example shown in FIG. 5, the defined region 14 is divided by a grid structure and defined into the compaction locations 15. Of course, the compaction locations 15 can also be placed or sorted differently.

The specification of the defined region 14 and the compaction locations 15 can take place externally, i.e., outside of the internal vibrator 2. In particular, this work can also be recorded via a network or with the aid of a laptop. The specification of the compaction locations 15 can be performed by an expert who has deeper knowledge about the concrete compaction than the operator 1. The operator 1 therefore only has to request the compaction locations 15 in succession.

A compaction coordinate specification device, which forms a planning system, using which the planning data can be developed beforehand, can also be provided for documenting the specification performed by an expert or also for automatically developing a suitable specification of the compaction locations 15 and their sequence.

Corresponding information can be conveyed to the operator 1 via the display 13 for orientation, about where the closest compaction location 15 is currently to be found and where the operator 1 is accordingly to immerse the vibrating unit 3.

Figure 6:
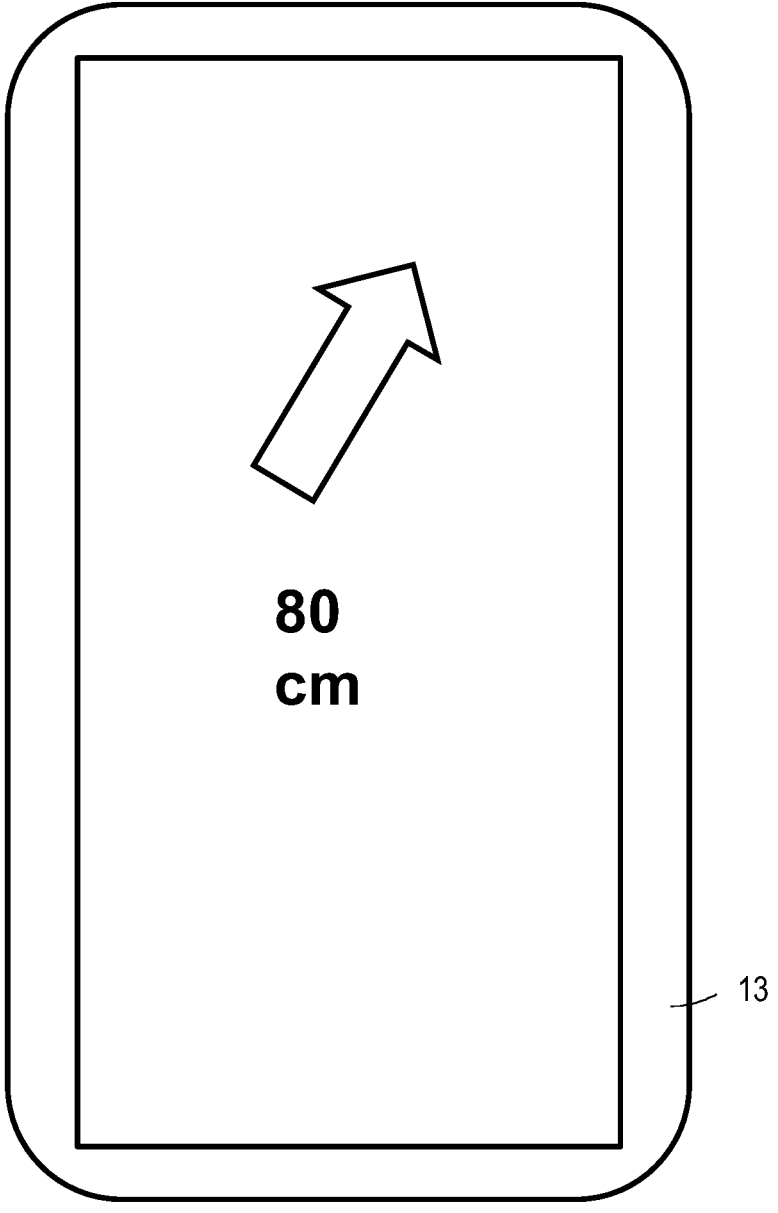
FIG. 6 shows a display device of the assistance system.

FIG. 6 shows by way of example a smart phone used as a display 13, on which it is displayed to the operator 1 with the aid of an arrow and a distance specification (here: 80 cm), in which direction and to what extent the vibrating unit 3 still has to move before the vibrating unit 3 has reached the specified position and can be immersed into the concrete to be compacted.

The display 13 is only shown as an example. In particular, the display 13 does not have to be housed in a smart phone or tablet. In one variant, for example, it is possible to integrate the display 13 in AR (augmented reality) glasses and to display the compaction locations 15 directly to the operator in this way, which he is to process in succession. Upon the visualization of the optimal compaction points with the aid of AR glasses, the compaction points can therefore be displayed to the operator directly on the concrete surface to be compacted.

The compaction locations 15 can thus be understood as optimal compaction points which are specified beforehand by the planning system.

During working operation, the assistance system 12 accesses the respective planning data and compares them to the current position of the operator 1 or the internal vibrator 2. The vibrating unit 3 can be taken into consideration with particular accuracy.

When the operator 1 is at the optimal position or in adequate proximity, they receive corresponding feedback, for example via the display 13, and can immerse the internal vibrator 2.

When the compaction process is completed, with appropriate design of the assistance system 12, the operator 1 can receive feedback that sufficient compaction has been performed. This feedback can take place, for example, in a tactile manner, for example by a jerk in the protection and operation tube 8. Alternatively or additionally, acoustic and/or optical signals can also be generated which indicate to the operator 1 that sufficient compaction has been performed.

The direction and the distance to the closest compaction location 15 is then displayed to the operator 1 via the display 13.

During the concreting, it can therefore be documented on the display 13 whether sufficient compaction was performed at all planned points (compaction locations 15) or in adequate proximity thereto. If the display 13 is part of a mobile device, such as a smart phone or a tablet, the data can be transmitted to a further network 16. However, the network 16 is not necessarily part of the assistance system 12.

In one variant, it is possible that a specific duration begins to run when the operator has compacted at one point. After passage of a specified duration, it is displayed to the operator that the concrete is beginning to harden at this point and compaction is no longer possible.

In another refinement, the operator can be prompted within this duration to compact once again at this point if the compaction at this point was not sufficient. It is therefore possible that the concrete is still compacted before it hardens.

The invention claimed is:

1. A system for guidance of an operator during concrete compaction using a handheld concrete compaction device, the system comprising:
   a planning device that is configured to store planning data, wherein the planning data are used to define specific locations in a defined region at which concrete compaction is to be performed using the concrete compaction device;
   a receiver device carried by the operator;
   a position determination device that is configured to determine a respective current position of a vibrating unit of the handheld concrete compaction device based on a location of the receiver device by;
   using a surface position determination device to determine the position of the receiver device in a plane;
   determining the orientation (A) of a working direction of the operator; and
   correcting the position of the receiver device with an offset (O) in the direction of the orientation (A) of the working direction and, thus, for determining the position (P2) of the vibrating unit in the plane;
   a depth position determination device for determining the position of the vibrating unit of the handheld concrete compaction device in a depth; and
   a display device that is configured to display the specific location within the defined region at which concrete compaction is currently to be performed.

2. The system as claimed in claim 1, wherein
   the planning data are also used to define a sequence of the locations in which the concrete compaction is to be performed; and wherein
   the display device is designed to display, at least in each case, the location in the sequence of locations at which concrete compaction is currently to be performed.

3. The system as claimed in claim 1, wherein the display device is designed to display the position of the concrete compaction device and/or to display, at least in each case, the location in the sequence of locations at which concrete compaction is to be performed next.

4. The system as claimed in claim 1, wherein the display device is designed to display the location at which concrete compaction is to be performed currently or next, in relation to the current position of the concrete compaction device.

5. The system as claimed in claim 1, further comprising a compaction coordinate specification device that is configured to generate planning data which are storable in the planning device.

6. The system as claimed in claim 1, further comprising a confirmation device that is configured to confirm that sufficient concrete compaction has been achieved at the respective location at which concrete compaction is currently being performed; and
   wherein
      the confirmation device is designed to mark a next location in a sequence of locations at which concrete compaction is to be performed next.

7. The system as claimed in claim 6, wherein
   the confirmation device is actuatable manually by an operator to confirm that sufficient compaction has been performed; and/or
   the confirmation device is actuatable automatically when a compaction detection device has detected that sufficient compaction has been performed at the current location by the concrete compaction device.

8. The system as claimed in claim 1, wherein
   the position determination device includes:
   a surface position determination device configured to determine the position of the receiver device in a plane;
   an orientation determination device that is configured to determine an orientation (A) of a working direction of the operator; and
   a correction device that is configured to correct the position of the receiver device with an offset (O) in the direction of the orientation (A) of the working direction and, thus, for determining the position (P2) of the vibrating unit in the plane.

9. The system as claimed in claim 1, wherein the depth position determination device has a distance measuring device for measuring a distance between the vibrating unit and the receiver device of the surface position determination device.

10. The system as claimed in claim 1, further comprising a comparison device that is configured to compare a current position of the concrete compaction device to at least a current first location of the specified sequence of locations at which concrete compaction is to be performed next, and to detect a deviation of the position of the concrete compaction device from the specified location; and
   a guidance device that is configured to define a movement measure for moving the concrete compaction device, wherein the deviation can be reduced using the movement measure; wherein the display device is designed to display the movement measure to the operator.

11. The system as claimed in claim 1, further comprising a proximity detection device that is configured to detect a state in which the deviation is less than a specified deviation limiting value, and to generate a confirmation signal.

12. The system as claimed in claim 1, wherein the planning data, in addition to the data for defining the locations at which concrete compaction is to be performed, have further data for a relevant location, selected from the group consisting of:

duration of the compaction at the relevant location;

intensity of the compaction at the relevant location;

number of vibrations of the compaction at the relevant location;

concrete type or concrete class;

concrete mixing ratios;

data on rebar;

dumping height of the concrete;

ambient temperature;

temperature of the concrete;

ambient humidity.

13. A method for guidance of an operator during concrete compaction using a handheld concrete compaction device, comprising:

storing planning data, wherein the planning data are used to define specific locations in a defined region at which concrete compaction is to be performed using a vibrating unit of the handheld concrete compaction device, and to define a sequence of the locations in which the concrete compaction is to be performed;

determining the respective current position of the vibrating unit of the handheld concrete compaction device based on a location of a receiver device carried by the operator including:

using a surface position determination device to determine the position of the receiver device in a plane;

determining the orientation (A) of a working direction of the operator; and correcting the position of the receiver device with an offset (O) in the direction of the orientation (A) of the working direction and, thus, for determining the position (P2) of the vibrating unit in the plane;

determining a depth of the vibrating unit of the handheld compaction device based on a depth position determination device; and displaying the specific location in the sequence of locations within the defined region at which concrete compaction is currently to be performed and/or the specific location in the sequence of locations at which concrete compaction is to be performed next.

14. The system as claimed in claim 1, wherein the depth position determination device determines the position of the vibrating unit of the handheld concrete compaction device in relation to the receiver device.

15. The method as claimed in claim 13, further comprising determining a depth of the vibrating unit of the handheld compaction device based on a depth position determination device including determining the position of the vibrating unit of the handheld concrete compaction device in relation to the receiver device.

* * * * *